April 2, 1929.  R. LA PEGNA  1,707,864
BOOKKEEPING MACHINE
Filed Dec. 8, 1926  5 Sheets-Sheet 1

INVENTOR
R. La Pegna
by Langner, Parry, Card & Langner
Attys

April 2, 1929.   R. LA PEGNA   1,707,864
BOOKKEEPING MACHINE
Filed Dec. 8, 1926   5 Sheets-Sheet 2
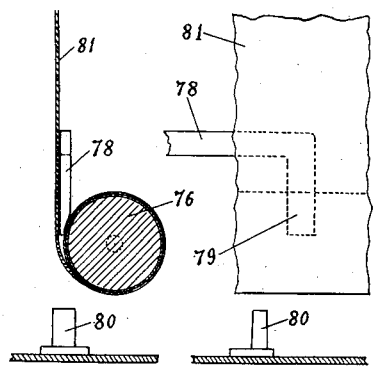
Fig. 19   Fig. 19ᴬ
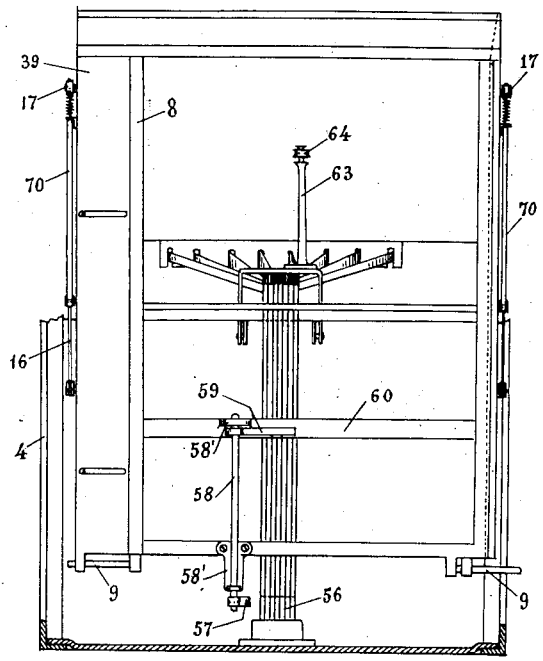
Fig. 15
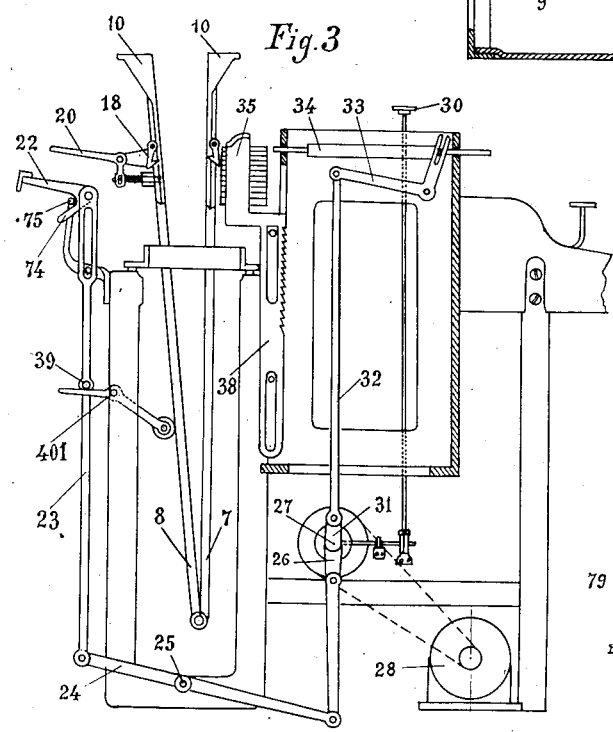
Fig. 3
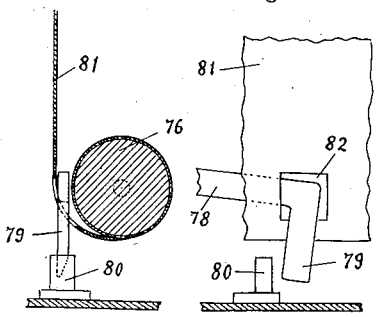
Fig. 20   Fig. 20ᴬ
INVENTOR
R. La Pegna
by Langner, Parry, Card & Langner
Attys.

April 2, 1929.   R. LA PEGNA   1,707,864
BOOKKEEPING MACHINE
Filed Dec. 8, 1926   5 Sheets-Sheet 3
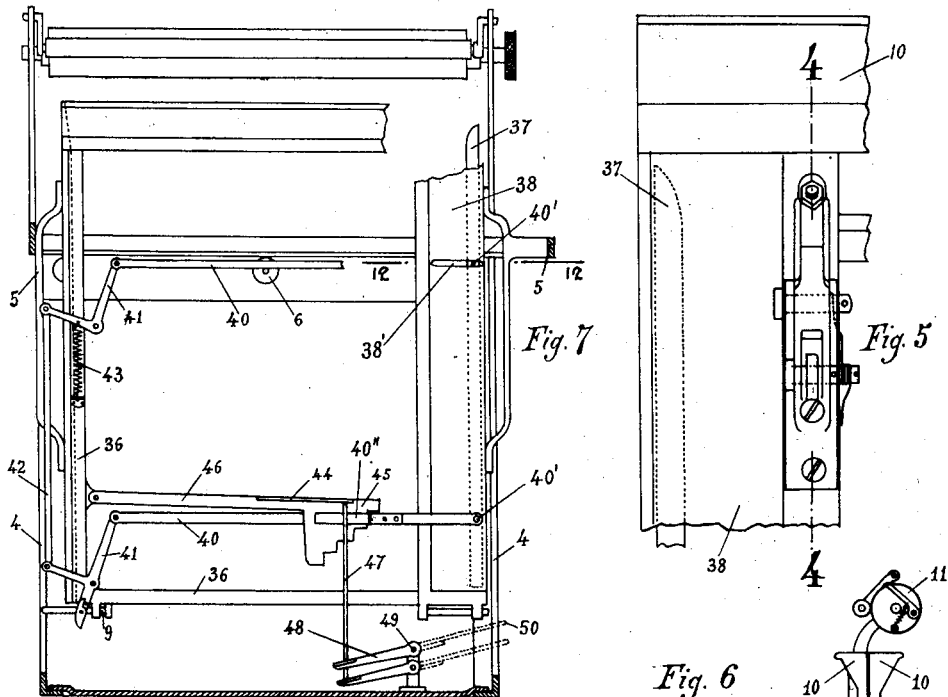
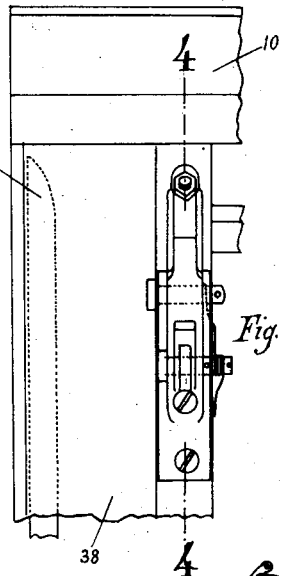
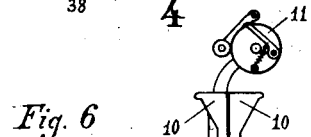
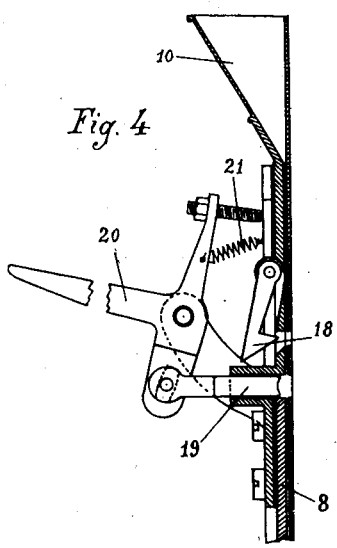
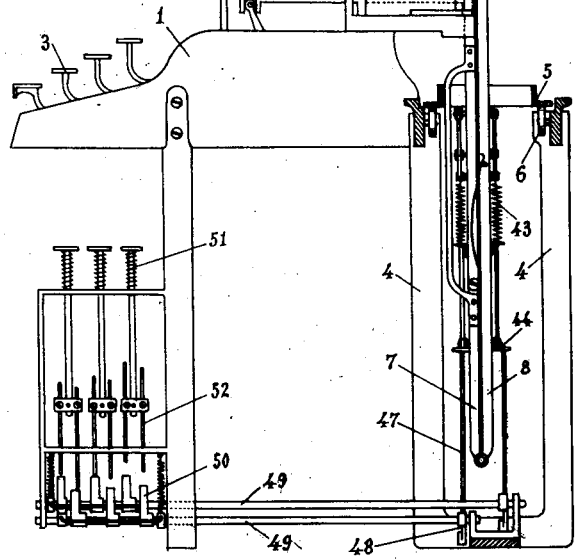
INVENTOR
R. La Pegna
Att'ys.

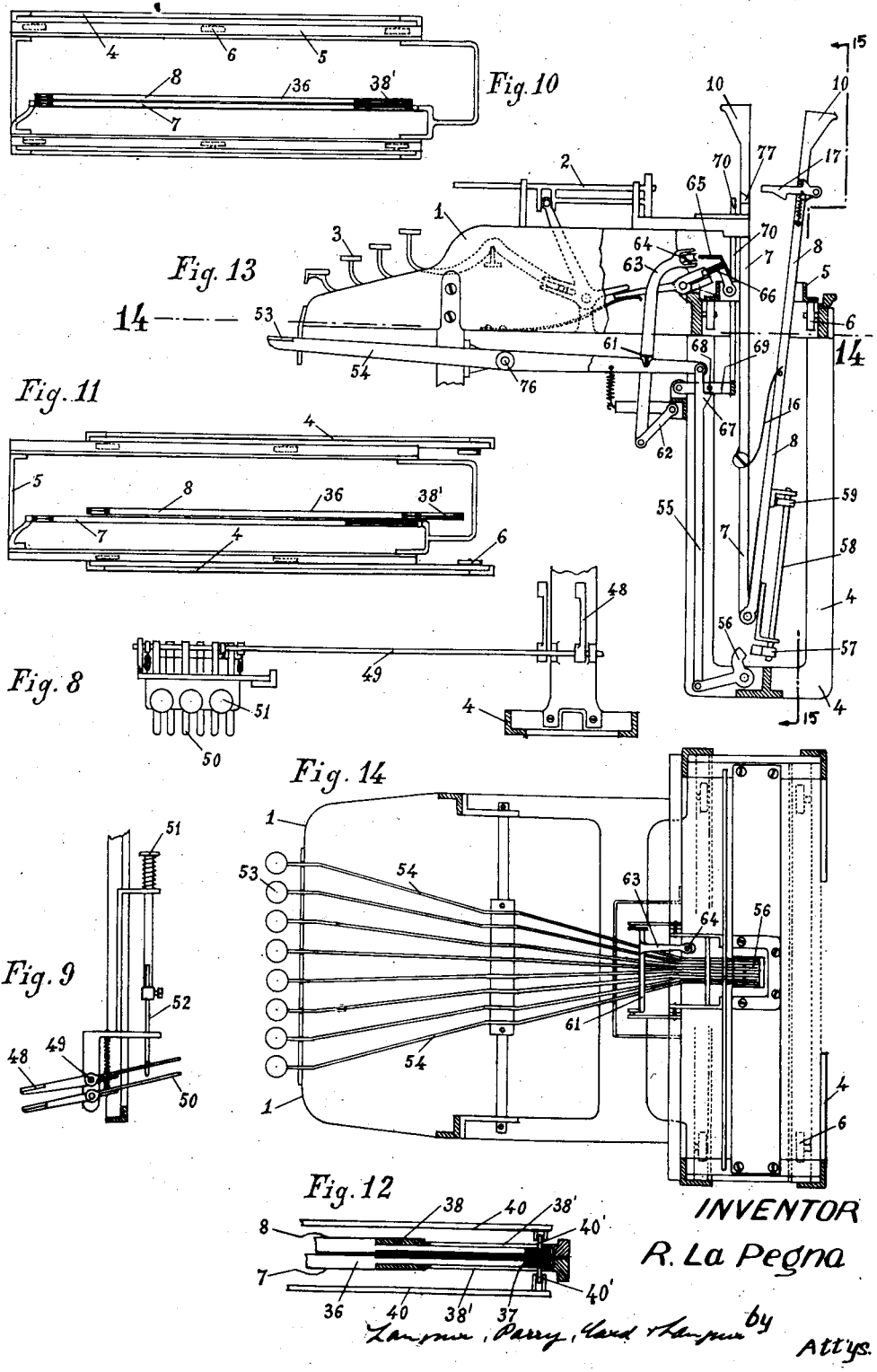

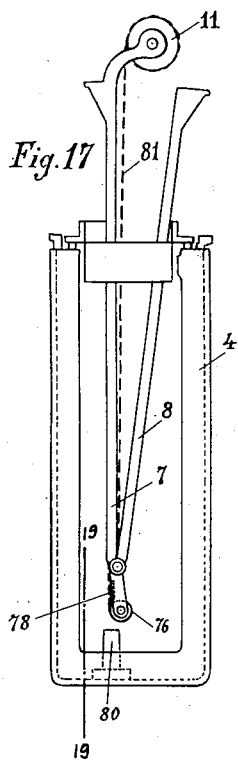
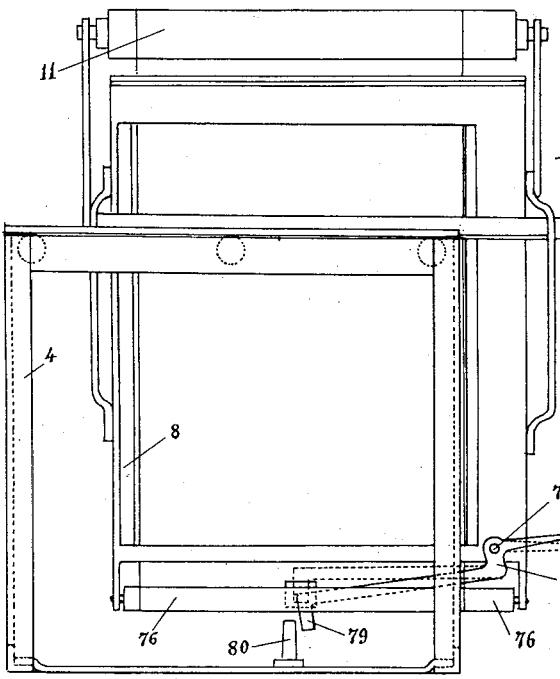
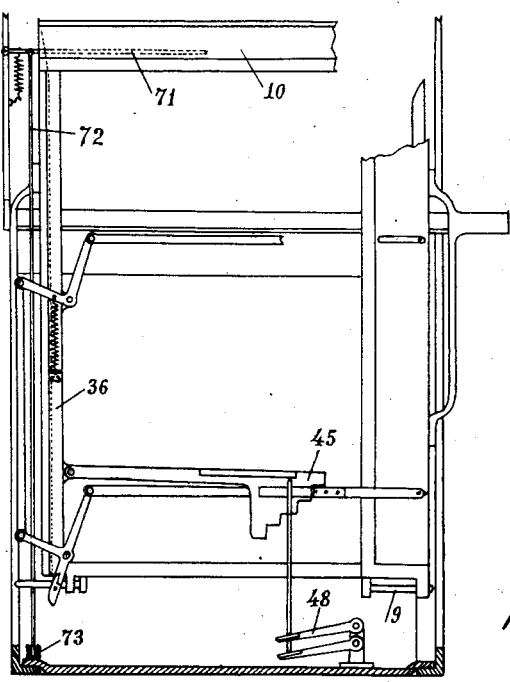

Patented Apr. 2, 1929.

1,707,864

UNITED STATES PATENT OFFICE.

RAFFAELLO LA PEGNA, OF MILAN, ITALY.

BOOKKEEPING MACHINE.

Application filed December 8, 1926, Serial No. 153,419, and in Italy December 12, 1925.

This present invention relates to bookkeeping machines and has for its object a machine for book-keeping according to carbon duplication method, in which entries are made at the same time on a record sheet (used as a day-book sheet) and on cards of given accounts.

The machine according to the present invention comprises mainly two carriers one of which carries a card of an account and the other one carries a card of another account and a record or day-book sheet, said carriers being interconnected with each other by means adapted to hold said two cards in register with each other for writing the description of entries and then to move them transversely with respect to each other through the space of a column, in order to carry a given column (as the credit-column) of one card in register with another column (as the debit-column) of the other one, all said entries being made in the single column of said record sheet.

The present invention comprises also means for the arrangement of said card-carriers on the frame of a typewriter, means by which the size of said card-carriers is automatically adapted to the size of cards intended to be inserted therein, means for positioning cards for subsequent entries, means for producing the respective adjustment of the two card carriers at the time the entries are to be written, and means preventing the actuation of the machine unless said carriers, cards and sheet are in their correct positions.

For the understanding of the following specification and claims it is pointed out that the cards herein referred to may be of any suitable material and they may loose ledger sheets, account statements and so on, and that said record sheet is used to provide a permanent time-progressing record of all entries made by the machine on said cards.

On the annexed drawings is shown by way of example an embodiment of a machine according to this invention as embodied in connection with a typewriter and Figure 1 is a diagrammatic plan view of the whole machine;

Figure 3 is a fragmentary sectional view of the machine on line 3—3 of Fig. 1 with carriage in open position and as viewed from opposite side with respect to Fig. 2;

Figure 4 is a fragmentary transverse section on enlarged scale of a card carrier and of a perforating device, said section being made on a line substantially corresponding with the line 13—13 of Fig. 1;

Figure 5 is a fragmentary front view of the parts shown in Fig. 4;

Figure 6 is a vertical transverse section on line 6—6 of Fig. 1 with carriage in closed position and parts omitted;

Figure 7 is a fragmentary transverse section on line 7—7 on Fig. 1 with a single card carrier shown;

Figure 8 is a diagrammatic and fragmentary detail plain view of a control device;

Figure 9 is a diagrammatic and fragmentary side view of parts shown in Fig. 8;

Figure 10 is a plan view of parts shown in Fig. 7;

Figure 11 is a plan view similar to Fig. 10 with parts in a different position;

Figure 12 shows on an enlarged scale and in a fragmentary transverse section on line 12—12 of Fig. 7 one side of the two-card carriers in their position shown in Fig. 10;

Figure 13 is a vertical transverse section on line 13—13 of Fig. 1 with parts omitted;

Figure 14 is a plan sectional view on line 14—14 of Fig. 13 with parts omitted;

Figure 15 is a fragmentary sectional view on line 15—15 of Fig. 13;

Figure 16 is a fragmentary sectional view on line 7—7 of Fig. 1 and shows a detail of the carriage;

Figure 17 is a side view showing a modified construction of the carriage;

Figure 18 is a front view of the same;

Figure 19 is a diagrammatic fragmentary detail transverse section on an enlarged scale on line 19—19 of Fig. 17;

Figure 2:
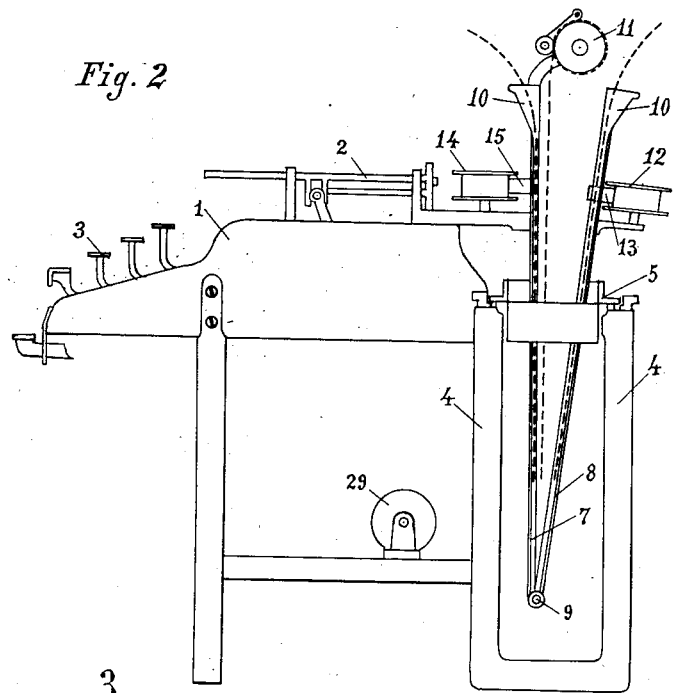
Figure 2 is a side view of the machine with carriage in open position.

Figure 19$^A$ is a front view corresponding with Fig. 19;

Figures 20 and 20$^A$ are views similar to Figures 19 and 19$^A$ respectively with parts in different positions.

In the embodiment illustrated and described the machine comprises a typewriter of any suitable construction, referred to as a whole by 1, which is illustrated in the form of a typewriter having reciprocatory printing parts 2 adapted to be actuated by key levers 3 (Figs. 1, 2, 6, 13 and 14).

The typewriter frame is supported by a further stationary frame 4 which provides a space for arrangement of a carriage including guide-parts 5 supported on rollers 6 carried by frame 4 (Fig. 6). The carriage is moved towards one end of its stroke by a spring and its progression or feeding-motion is controlled by a trip-gear. These means are well known in typewriter art and they are not described and shown in detail herein, being of common knowledge.

The carriage referred to by reference 5 comprises two carriers 7 and 8, of which carrier 7 is secured to frame 5 and carrier 8 is pivoted on frame 7 along its lower edge by means of pivots 9 providing also for a longitudinal respective displacement of said carriers 7 and 8 (Figs. 6 and 15).

Each of carriers 7 and 8 comprises grooved side bars adapted to embrace the edges of a sheet or card, and on the top of each carrier an enlarged mouth 10 is provided for assisting the card in being introduced therein.

On carrier 7 is mounted a rotatable drum 11 adapted to receive a bobbin of a paper sheet which passes down between carriers 7 and 8, and the carrier 8 has at its two ends spools 12 for an ink ribbon 13 which extends along the span of carrier 8 and is preferably actuated by a ribbon feeding device (not shown) each time the carriage is shifted to a position in which the carriers 7 and 8 are moved away from each other, as hereinafter described.

In the frame of typewriter 1 are further provided spools 14 for an inking ribbon 15 which moves along the front face of the carrier 7 and is fed in the manner generally known in typewriters.

The carrier 7 and 8 are acted on by a spring 16 tending to move them away from each other and are held in contact with each other by a spring hook 17 engaging a nose 77, said hook and nose being provided on said carriers as shown in Fig. 13.

At the top end of each side bar, each carrier 7 and 8 is provided with a card aligning tooth 18 (Figures 4 and 5) intended to engage holes of the card introduced in the same, and on the carrier 7 which is secured to carriage 5 is arranged, below each tooth 18, a perforating device comprising a perforating pin 19 connected with an adjustable lever 20 which is usually held in inoperative position by a spring 21.

Figure 1:
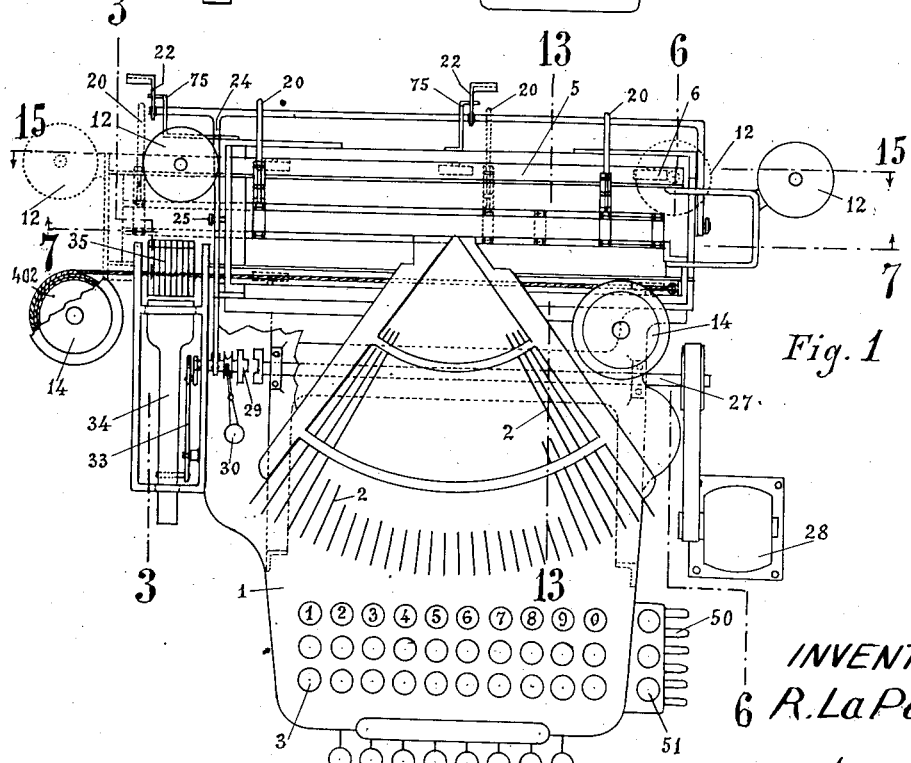

When carriage 5 and associate carriers 7—8 are at the left end of their stroke, the said levers 20 are in front of crank levers 22 having a nose 74 and bearing on a stationary pin 75 (Fig. 3). The levers 22 are articulated with a rod 23 which at its opposed end is articulated with a lever 24 fulcrumed at 25. Levers 24 are connected with a control device comprising a crank 26 actuated by a shaft 27 driven by a motor 28 (which is assumed to be continuously in operation during the use of the machine) by means of an automatic coupling 29 of known construction adapted to make a complete revolution and then to be uncoupled, said coupling being further adapted to be operated by hand, say by means of a handle 30 (Fig. 1).

The said motor drives also, by means of crank 31, rod 32 and lever 33 (Fig. 3), a plunger 34 adapted to act on a date printing stamp and an adjustable counter 35 of any suitable construction.

The device 35 preferably includes a progressive counter which may be actuated by the carriage at each stroke of the same, a printing device actuated at each operation in a manner depending on the type of cards introduced in the carriers, and a date-printing stamp having automatic operation or not. It is located at the left end of the machine frame to produce its impressions in respective columns near the left edge of the cards and sheet.

The rod 23 is provided with a pin 39 adapted, when the rod 23 is moved down, to act on an arm of a lever 401 whose other arm has a roller acting on the side bars of the carrier 8 to move this carrier towards carrier 7.

As shown in Figures 7 and 12, the carriers 7 and 8 are identical with each other and are formed by frame bars 36 and opposite plates 38 adapted to receive the cards between them. A blade 37 is mounted to move in the space provided by said plates 38 of each carrier and said blades are connected by tails 40' moving through slots 38' and rods 40, with levers 41 interconnected by a rod 42. A spring 43 causes rod 42, levers 41 and blades 37 to move towards bar 36 while a stepped abutment 45 carried by an arm 46 fulcrumed on the frame 36 is adapted to engage and stop said parts. The arms 46 of the two carriers are provided with lugs 44 having depending rods 47 whose lower ends may be engaged by arms 48 secured to spindles 49 having actuating arms 50 keyed thereon.

Said arms 50 are under the control of a device arranged at one side of the keyboard of the typewriter. In the illustrated embodiment said keyboard includes three keys 51 each having two extensible stems 52 adapted to actuate the arms 50 of two different spindles 49.

By adjusting the extensible stems 52 the two spindles 49 may be caused to swing through different angles by the actuation of a given key 51, and then the respective arms 48 are actuated through different angles thus producing proportional displacements of stepped abutments 45 and causing them to engage the noses 40" of rods 40 of the two carriers 7 and 8 at different points of their stroke due to springs 43, the blades 37 being thus stopped in selected positions.

The widths of both carriers 7 and 8 free for reception of cards is thus controlled by a single operation by means of keys 51 which are in a number corresponding with the number of combinations of cards which must be written on at the same time in the machine, it being borne in mind that cards having different widths are used in respect of several accounts. Then at each operation it is possible to introduce in the carriers only cards of accounts corresponding with the combinations identified by the particular key 51 which has been manipulated by the operator, because either other cards are prevented from entering the carrier or the operator is warned of mistake by feeling that cards cannot be correctly located in carriers owing to a much too large space left free therein.

The size of each of the carriers 7 and 8 may be altered separately by acting directly on respective arms 50.

The typewriter frame 1 is also provided with a series of keys 53 each of which actuates a lever 54 fulcrumed at 76 and acting by means of a rod 55 on a lever 56 fulcrumed on the bottom of the carriage supporting frame 4 (Figs. 13 and 15).

Levers 56 are spaced from each other through a step of the carriage feeding motion and they cooperate with a projecting tooth 57 of the carriage to stop it in a position where the printing point of the typewriter is in register with columns of cards intended to be written on.

Keys 53 are in a number equal to number of figures of the maximum amount or item the machine is adapted to write, and provide means for properly locating the carriage when an amount is to be written, like the known tabulators of typewriters.

Tooth 57 is solid with a spindle rotatable in bearings 58' of movable carrier 8 and having an arm 59 which abuts on a transverse bar 60 of the said carrier.

Levers 54 bear on a common cross bar 61 which is articulated by means of links 62 at stationary points of the frame and is provided with an arm 63 having at its end a roller 64 running on a bar 65 secure to the rack 66 of the typewriter trip gear. The rods 55 are further provided with teeth 67 acting on a common bar 68 carried by levers 69 which are fulcrumed on a rod 70 mounted to slide vertically along the carrier 7 and having its free end opposite the end of hook 17 when this latter holds the two carriers 7 and 8 engaged with each other.

The carriage 5 is preferably engaged with the stationary frame of the machine by means of a member which is made inoperative only when both the cards are in correct position in respective carriers 7 and 8. For this purpose, as shown in Figure 16, an arm 71 is articulated in each carrier and is held by a spring in the respective mouth 10, and a bar 72 is connected with said arm and arranged to engage the stationary frame when said arm 71 lies within its respective mouth.

The carriage is thus free to move only when arms 71 of both carriers have been raised by the operator to introduce the cards in position, and thus the machine cannot be operated unless the cards are in correct position.

To prevent operation of the machine at the time the record or day-book sheet is not inserted, the construction shown in Figures 17 and 18 is used.

The carrier 7 mounted on frame 5 together with carrier 8 is provided as described with a drum 11 on which is wound the paper band providing the record or day-book sheet 81, and it further carries a rotatable drum 76 carrying supply bobbin of said paper. On said carrier an arm 78 is pivoted at 77 said arm having a finger 79, and on the stationary frame 4 is provided a stationary abutment 80 which is engaged by finger 79 at the time arm 78 is in its lowermost position.

The finger 79 of arm 78 bears on the rear face of sheet 81 when this latter is in position, and therefore in this condition said finger does not engage abutment 80 and the feeding motion of the carriage and operation of the machine may take place freely (Figures 19 and 19A). On the contrary when sheet 81 is not correctly inserted, finger 79 of arm 78 is not engaged. And then said finger and lever may move down into the position shown in full lines in Fig. 18 and said finger engages abutment 80, the carriage being thus locked.

Each paper band 81 is preferably provided with an extension having a slot 82 near its lower edge at the point where finger 79 is located. Then when the paper band is nearly exhausted, the finger 79 may pass through slot 82 and act to prevent the feeding movement of the carriage (Figures 20 and 20A).

The operation of the described machine is as follows; it being borne in mind that it is assumed a bobbin of translucent paper strip winds on roller 11, said paper providing a permanent record or day-book, and two cards are located in carriers 7 and 8, said cards corresponding with two accounts on which items to be recorded must be posted, each item to be written in a single column of record sheet, in the credit-column of one card and in the debit-column of the other one.

The cards are introduced in their respective carriers 7 and 8, after having raised arms 71 and thus released the carriage, by inserting them in mouths 10 and they are correctly positioned between the stationary side bar 36 of the respective carrier and the adjustable blade 37 of the same. The position of this latter depends, as described, upon the particular key 51 which has been lowered and the cards of the several accounts, having different sizes as above disclosed, may be introduced in said carriers only when they correctly correspond with the particular combination set up for entry by the particularly manipulated key 51. Each card has originally a single perforation on each side of its writing line and teeth 18 (Fig. 4) engage said perforations when the card is in correct position in its carrier. Each card is provided with only two top perforations preparatory for its use, further alignment perforations being produced in and for subsequent operations.

The first manipulation is to depress the particular key 51 which corresponds with the desired combination that will cause the desired respective positioning of abutments 45 and cooperating parts of carriers 7 and 8. This manipulation being preferably imparted also to a printing device included in the date-printing stamp 35, to produce on said sheet and cards indicia showing the particular combination under which the entry is made.

After the cards and record sheet have been put in position, the carriage is shifted to its left end position (as shown in dotted lines in Fig. 1) such a manipulation being permitted only when the said record sheet is in correct position, finger 79 of lever 78 being otherwise engaged with abutment 80 (Fig. 18). Then lever 30 of clutch 29 is manipulated, this clutch acting to connect through a whole revolution the shaft of the cranks 26 and 31 with the motor 28 which is assumed to be in continuous operation and then to disconnect the same.

Then levers 24 are oscillated, said levers acting first through rods 23, pins 39 and levers 401 to move carrier 8 close to carrier 7, and then actuating levers 22 which engage levers 20 and operate them when rods 23 are further depressed.

The perforating pins 19 are thus put in operation, said pins producing in each card, along a line which lies under the perforations engaged at this time by teeth 18, two further perforations which are engaged by teeth 18 in the subsequent entries being made on the same cards.

The crank 31 is actuated in unison with crank 26, said crank 31 actuating rod 32 and lever 33 and driving forward the plunger 34 which causes the date printing stamp to make an impression on the cards at the same time as the perforating pins 19 are actuated. The counters and recording devices associated with said stamps are also actuated by plunger 34.

After the described operation of levers 401, carriers 7 and 8 are held engaged with each other by the hook 17 (see Fig. 6), while the clutch 29 uncouples the motor 28 from cranks 26 and 39 after one full revolution of the same and the parts connected therewith are returned to inoperative position.

The indicia provided by device 35 are produced on the front card located in carrier 7 through the inking ribbon 15 while they are produced on the other card located in carrier 8 by ribbon 13 and the intermediate sheet is printed on from the back by same ribbon 13, the said record sheet being of translucent paper as above disclosed.

By the described manipulation the required indicia are produced on the left end side of cards and sheet, the said printing device 35 being located at the left side of the machine, that is, in register with the end of the carriage progression, it being forcibly spaced apart from the printing point of the typewriter.

Thereafter the carriage is shifted to the right end of its stroke (full-line position of Fig. 1) to carry the left end side of the cards and sheet in register with the typewriter printing point, as required for writing on said cards and sheet in the usual manner.

The description of the entries is obtained by the manipulation of the typewriter keys 3 and it is produced on both cards and intermediate sheet in the same manner as above described.

After the description of the entry is completed, the desired one of tabulating keys 53 is depressed, that is the one which corresponds with the position occupied in the figure column by the highest figure of the number or item to be entered, say the 4th one from right when an item of four figures is to be written, and then the carriage moves under action of its spring until its tooth 57 engages the tooth 56 shifted by the depressed key 53, because the rack bar 66 is released from its trip tooth as soon as either of keys 53 is depressed.

The depression of either of keys 53 above referred to has at the same time caused the release of hook 17 through the intermediate of rod 55, tooth 57, pin 68, lever 69 and rod 70, and therefore, after the carrier 8 has engaged by its tooth 57 the particular tooth 56 which has been raised by the described operation, the carrier 7 is still moving under the action of the carriage spring and slides longitudinally through the extent permitted by pins 9 (Fig. 16) with respect to carrier 8, this respective motion providing for correct location of the debit-column of one card in register with the credit-column of the other one.

Then the thrust produced on tooth 57 under the action of the carriage spring causes the spindle 58 and arm 59 to rotate, said arm 59 acting on the carrier 8 and causing it to move again close to the carrier 7 under the action of the carriage spring, all the parts coming thereafter to a stop.

Thereafter the desired item or figure is written by manipulating the keys of the typewriter, and said item is printed at the same time in the respective columns of the two cards and on the record or day-book sheet.

The entry is thus completed on both cards and record sheet, and the item figures are written in two different columns in said cards adjacent to desired indicia and item description while in the record or day-book the several items or entries are written in a single column as required.

It is to be understood that the present invention is not restricted to the embodiment described and illustrated and it is merely confined by appended claims, a number of parts being adapted to be made or arranged in different manner. Thus the date-printing stamp 35, perforating device, and so on, may be different with respect to those described and illustrated, and any suitable driving means may be used in lieu of electromotor 28.

What I claim as my invention and desire to secure by United States Letters Patent is:—

1. A book-keeping machine comprising means for carrying a card, means for carrying another card, means carrying a record sheet, means for putting said card and sheet-carrying means in position for making entries on said cards and sheet, and means for shifting said means carrying one of said cards with respect to said means carrying the said other card and sheet for making further entries at different points of the same.

2. A book-keeping machine comprising means for carrying a card, means for carrying another card, means secured to one of said card-carrying means and carrying a record sheet, means for typewriting on said cards and sheet, means for putting said card and sheet-carrying means in position for making entries on said cards and sheet, and means for shifting said means carrying one of said cards with respect to said means carrying the said other card and sheet for making further entries at different points of the same.

3. A book-keeping machine comprising typewriting means including a carriage and means for step-by-step progression of the same, a card carrier secured to said carriage, a record sheet carrier secured to the said card carrier, a movable card carrier, means connecting said movable carrier with said carrier for respective sliding motion, means for engaging said two card carriers with each other through a portion of the progression of said carriage, and means for releasing and shifting said movable card carrier with respect to said card carrier preparatory to a further portion of said carriage progression.

4. A book-keeping machine comprising typewriting means including a carriage and means for step-by-step progression of the same, a card carrier secured to said carriage, a record sheet carrier secured to said card carrier, a movable card carrier, means in each of said carriers for adapting each of them for reception of a selected card, means connecting said movable carrier with said card carrier for respective sliding motion, means for engaging said two card carriers with each other through a portion of the progression of said carriage, and means for releasing and shifting said movable card carrier with respect to said card carrier preparatory to a further portion of said carriage progression.

5. A book-keeping machine comprising typewriting means including a carriage and means for step-by-step progression of the same, a card carrier secured to said carriage, a record sheet carrier secured to said card carrier, a movable card carrier, means in each of said carriers for adapting each of them for reception of a selected card, means for controlling bodily said adapting means of both said card carriers, means connecting said movable carrier with said card carrier for respective sliding motion, means for engaging said two card carriers with each other through a portion of the progression of said carriage, and means for releasing and shifting said movable card carrier with respect to said card carrier preparatory to a further portion of said carriage progression.

6. A book-keeping machine comprising typewriting means including a carriage and means for step-by-step progression of the same, a card carrier secured to said carriage, a record sheet carrier secured to said card carrier, a movable card carrier, means in each of said carriers for aligning said respective cards in the same, means connecting said movable carrier with said card carrier for respective sliding motion, means for engaging said two card carriers with each other through a portion of the progression of said carriage, and means for releasing and shifting said movable card carrier with respect to said card carrier preparatory to a further portion of said carriage progression.

7. A book-keeping machine comprising typewriting means including a carriage and means for step-by-step progression of the same, a card carrier secured to said carriage, a record sheet carrier secured to said card carrier, a movable card carrier, means in each of said carriers for engaging positioning means of said cards, means connecting said movable carrier with said card carrier for respective sliding motion, means for engaging said two card carriers with each other through a portion of the progression of said carriage, means for providing further positioning means in said cards preparatory to further entries on the same, and means for releasing and shifting said movable card carrier with respect to said card carrier preparatory to a further portion of said carriage progression.

8. A book-keeping machine comprising typewriting means including a carriage and means for step-by-step progression of the same, a card carrier secured to said carriage, a record sheet carrier secured to said card carrier, a movable card carrier, means in each of said carriers for engaging positioning means of said cards, means connecting said movable carrier with said card carrier for respective sliding motion, means for engaging said two card carriers with each other through a portion of the progression of said carriage, means for providing further positioning means in said cards preparatory to further entries on the same, means for producing indicia in said cards and sheet, means for operating said positioning-means-producing means and said indicium producing means while said card carriers are engaged together, and means for releasing and shifting said movable card carrier with respect to said card carrier preparatory to a further portion of said carriage progression.

9. A book-keeping machine comprising typewriting means including a carriage and means for step-by-step progression of the same, a card carrier secured to said carriage, a record sheet carrier secured to said card carrier, a movable card carrier, means connecting said movable carrier with said card carrier for respective sliding motion, means for engaging said two card carriers with each other through a portion of the progression of said carriage, means for releasing and shifting said movable card carrier with respect to said card carrier preparatory to a further portion of said carriage progression, and tabulating means operative for the last named portion of said carriage progression.

10. A book-keeping machine comprising typewriting means including a carriage and means for step-by-step progression of the same, a card carrier secured to said carriage, a record sheet carrier secured to said card carrier, a movable card carrier, means for locking said carriage when a card is not inserted in its carrier, means connecting said movable carrier with said card carrier for respective sliding motion, means for engaging said two card carriers with each other through a portion of the progression of said carriage and means for releasing and shifting said movable card carrier with respect to said card carrier preparatory to a further portion of said carriage progression.

11. A book-keeping machine comprising typewriting means including a carriage and means for step-by-step progression of the same, a card carrier secured to said carriage, a record sheet carrier secured to said card carrier, a movable card carrier, means for locking said carriage when said sheet is not inserted in its carrier, means connecting said movable carrier with said card carrier for respective sliding motion, means for engaging said two card carriers with each other through a portion of the progression of said carriage, and means for releasing and shifting said movable card carrier with respect to said card carrier preparatory to a further portion of said carriage progression.

12. A book-keeping machine comprising typewriting means including a carriage and means for step-by-step progression of the same, a card carrier secured to said carriage, a record sheet carrier secured to said card carrier, a movable card carrier, means for locking said carriage and means under the influence of said sheet in said carrier for releasing said carriage locking means, means connecting said movable carrier with said card carrier for respective sliding motion, means for engaging said two card carriers with each other through a portion of the progression of said carriage, and means for releasing and shifting said movable card carrier with respect to said card carrier preparatory to a further portion of said carriage progression.

13. A book-keeping machine comprising typewriting means including a carriage and means for step-by-step progression of the same, a card carrier secured to said carriage, a record sheet carrier secured to said card carrier, a movable card carrier, means in each of said carriers for adapting each of them for reception of a selected card, means in each of said carriers for engaging positioning means of said cards, means for locking said carriage when a card is not inserted in its carrier, means for locking said carriage when said sheet is not inserted in its carrier, means connecting said movable carrier with said card carrier for respective sliding motion, means for engaging said two card carriers with each other through a portion of the progression of said carriage, means for providing further positioning means in said cards preparatory to further entries on the same, means for releasing and shifting said movable card carrier with respect to said card carrier preparatory to a further portion of said carriage progression and tabulating means operative for the last named portion of said carriage progression.

14. A book-keeping machine comprising typewriting means including a carriage and means for step-by-step progression of the same, a card carrier secured to said carriage, a record sheet carrier secured to said card carrier, a movable card carrier, means in each of said carriers for adapting each of them for reception of selected card, selective means for controlling bodily said adapting means of both said card carriers, means in each of said carriers for engaging positioning means of said cards, means for locking said carriage when a card is not inserted in its carrier, means for locking said carriage, means under the influence of said sheet in said carrier for releasing said carriage locking means, means connecting said movable carrier with said card carrier for respective sliding motion, means for engaging said two card carriers with each other through a portion of the progression of said carriage, means for providing further positioning means in said cards preparatory to further entries on the same, means for producing indicia in said cards and sheet, means for operating said positioning-means providing means and said indicium-producing means while said card carriers are engaged together, means for releasing and shifting said movable card carrier with respect to said card carrier preparatory to a further portion of said carriage progression, and tabulating means operative for the last named portion of said carriage progression.

15. A book-keeping machine comprising typewriting means including a carriage and means for step-by-step progression of the same, a card carrier secured to said carriage, a record sheet carrier secured to said card carrier, a movable card carrier, a part mounted to move in each of said carriers for adjusting each of them for reception of a selected card, an adjustable member for locking said part in a predetermined position in its respective carrier, means for adjusting said member in each carrier, selective means adapted to actuate said adjusting means in both carriers, means connecting said movable carrier with said card carrier for respective sliding motion, means for engaging said two carriers with each other through a portion of the progression of said carriage, and means for releasing and shifting said movable card carrier with respect to said card carrier preparatory to a further portion of said carriage progression.

16. A book-keeping machine comprising typewriting means including a carriage and means for step-by-step progression of the same, a card carrier secured to said carriage, a record sheet carrier secured to said card carrier, a movable card carrier, means in each of said carriers for adapting each of them for reception of a selected card, means in each of said carriers for engaging positioning holes of said cards, means connecting said movable carrier with said card carrier for respective sliding motion, means for engaging said two card carriers with each other through a portion of the progression of said carriage, means for providing further positioning holes in said cards preparatory to further entries on the same, and means for releasing and shifting said movable card carrier with respect to said card carrier preparatory to a further portion of said carriage progression.

17. A book-keeping machine comprising typewriting means including a carriage and means for step-by-step progression of the same, a card carrier secured to said carriage, a record sheet carrier secured to said card carrier, a movable card carrier, means in each of said carriers for adapting each of them for reception of a selected card, selective means for controlling said adapting means of said card carriers, means in each of said carriers for engaging positioning means of said cards, means for connecting said movable carrier with said card carrier for respective rocking and sliding motion, means for holding said carriers spaced from each other, means for moving said movable carrier close to said card carrier and engaging them together through a portion of the carriage progression, means for driving in succession said carrier moving means and said positioning-means-producing means, means for releasing and shifting said movable card carrier with respect to said card carrier and means for moving again said movable card carrier close to said card carrier for further entries on the same.

18. A book-keeping machine comprising typewriting means including a carriage and means for step-by-step progression of the same, a card carrier secured to said carriage, a record sheet carrier secured to said card carrier, a movable card carrier, means in each of said carriers for adapting each of them for reception of a selected card, selective means for controlling said adapting means of said card carriers, means connecting said movable carrier with said card carrier and carriage for respective rocking and sliding motion, means for engaging said two card carriers with each other through a portion of the progression of said carriage, a set of tabulating stops, means for actuating said tabulating stops and releasing said carrier interengaging means, a part mounted on said movable carrier adapted to engage the actuated one of said stops for producing a respective motion of said movable carrier with respect to said card carrier and carriage, and cooperating means on said movable carrier and part causing said movable carrier to again come close to and engaged with said card carrier on account of said respective displacement.

In testimony whereof I have signed my name to this specification.

RAFFAELLO LA PEGNA.